2,912,409

RESINOUS CHLORINE CONTAINING POLYESTER, FIRE PROOF PLASTIC THEREFROM, AND PROCESS FOR PRODUCING SAME

Günther Nischk, Leverkusen, and Karl E. Müller, Leverkusen-Bayerwerk, Germany, assignors, by direct and mesne assignments, of one-half to Mobay Chemical Company, Pittsburgh, Pa., a corporation of Delaware, and one-half to Farbenfabriken Bayer Aktiengesellschaft, Leverkusen, Germany, a corporation of West Germany No Drawing. Application November 16, 1955
Serial No. 547,305

Claims priority, application Germany November 17, 1955

18 Claims. (Cl. 260—45.4)

This invention relates to new fireproof plastics and to a process for making the same. More particularly, the invention is concerned with fireproof plastics derived from new chlorine containing polyesters, a process for preparing said new chlorine containing polyesters and a process for converting the latter into the fireproof plastics of the invention.

It is known to produce fireproof plastics by reacting chlorine containing polyesters with vinyl compounds or polyisocyanates. The chlorine containing polyesters heretofore used in the production of fireproof plastics are either mixtures of polyesters with chlorine compounds, such as trichloroethyl phosphate, or contain chemically-bound chlorine, such as polyesters prepared from tetrachlorophthalic acid. However, uniform mixtures of polyesters with chlorine compounds are sometimes difficult to prepare and the known polyesters containing chemically-bound chlorine yield plastics with undesirable properties. Thus, fireproof plastics made from tetrachlorophthalic acid are brittle and consequently not suitable for a wide variety of applications.

It is an object of the present invention to provide fireproof plastics which may easily be prepared. Another object is to provide fireproof plastics which are superior in properties to some of the known fireproof plastics. Further objects will appear hereinafter.

These objects are attained in accordance with the invention by reacting a vinyl compound or a polyisocyanate with a polyester containing 20-50% by weight, and preferably 30 to 40% by weight, of chlorine and derived from tetrachlorophthalic acid or hexachloro endomethylene tetrahydrophthalic acid as acid component and tri-, tetra-, or penta-chlorophenyl monoglycerine ether as alcoholic component. As distinguished from the known polyesters prepared from tetrachlorophthalic acid as the sole chlorine containing component, the new polyesters prepared from tetrachlorophthalic acid or hexachloro endomethylene tetrahydrophthalic acid as acid component and tri-, tetra-, or pentachlorophenyl glycerine ether do not adversely affect the properties of the plastics produced therefrom even when containing the amount of chlorine required for making the end products fireproof.

The new chlorine containing polyesters of the invention are prepared in known manner by thermal esterification of polyhydric alcohols and polycarboxylic acids, using tetrachlorophthalic acid or hexachloro endomethylene tetrahydrophthalic acid as acid component and tri-, tetra-, or pentachlorophenyl glycerine ether in such amounts as to produce a polyester conaining 20 to 50% by weight and preferably 30 to 40% by weight of chlorine. In place of tetrachlorophthalic acid or hexachloroendomethylene tetrahydrophthalic acid as an acid component and tri-, tetra-, or pentachlorophenyl glycerine ether there may be employed functional derivatives of these compounds, such as the acid anhydrides and the epoxides of the chlorinated phenyl glycerine ethers which react as the free compounds under the conditions of the esterifications. Representative examples of polyhydric alcohols and polycarboxylic acids which may be used along with the chlorinated acids and alcohols or their functional derivatives in the preparation of the new chlorine containing polyesters include ethylene glycol, diethylene glycol, 1,4-butanediol, 1,4-butenediol, 1,4-butinediol, glycerine and trimethylol propane on the one hand and succinic acid, adipic acid, maleic acid, fumaric acid and phthalic acid on the other hand. The thermal esterification of these or analogous compounds is preferably carried out by heating the components, at first under ordinary pressure and then under reduced pressure, to a temperature within the range of 160 to 240° C. while distilling off the water formed in the esterification. The above examples indicate that the polyhydric alcohols may contain two or three hydroxyl groups.

Depending upon the nature and the molar ratio of the reactants, either ethylenically unsaturated polyesters or polyesters with free carboxyl and/or hydroxyl groups will be formed in the esterification. To produce an unsaturated polyester of the type disclosed herein, at least one ethylenically unsaturated polycarboxylic acid and/or ethylenically unsaturated polyhydric alcohol is concurrently used in the esterification. On the other hand, an excess of either polycarboxylic acid or polyhydric alcohol will result in the formation of a chlorine containing polyester with either free carboxyl or hydroxyl groups. The molar ratio of chlorinated acid to chlorinated alcohol according to the invention may range from 1:4 to 3:1.

In the subsequent reaction with vinyl compounds, i.e., polymerizable ethylenically unsaturated monomers, such as styrene, methyl methacrylate, diallyl phthalate and tetrachlorophthalic acid diallyl ester, unsaturated polyesters are used, whereas in the reaction with polyisocyanates, such as tetramethylene diisocyanate, hexamethylene diisocyanate, p-phenylene diisocyanate, p,p'-diphenylmethane diisocyanate, 1,2,4-toluylene diisocyanate, 1,2,6-toluylene diisocyanate, 1,5-naphthylene diisocyanate, there are employed polyesters containing free hydroxyl and/or carboxy groups.

The copolymerization between the new chlorine containing polyesters and vinyl compounds is preferably carried out at temperatures ranging from room temperature to 150° C. and in the presence of a peroxide catalyst, such as benzoyl peroxide, cyclohexanol peroxide, di-tert.-butyl-peroxide, all of which may be employed in combination with cobalt naphthenate, cobalt chloride, manganese naphthenate or tertiary aromatic amines e.g. dimethyl-p-toluidine. Depending upon the reaction conditions employed in the reaction between the new chlorine containing polyesters and polyisocyanates, either rubber-like materials or foamed plastics or coatings (including lacquers and films) are formed. If a linear hydroxyl polyester of the type disclosed herein is reacted with excess diisocyanate and a cross-linking agent, such as water, glycol and ethylene diamine, a fireproof rubber-like material is obtained. On the other hand, when reacting a carboxyl polyester with excess polyisocyanate or an hydroxyl polyester with excess polyisocyanate and a minor amount of water, preferably in the presence of a tertiary amine and a surface active agent, a fireproof foamed plastic is produced. Finally, fireproof coatings, lacquers and films will be obtained if a polyester of the above-described type is reacted with a polyisocyanate in an inert solvent, the solution is applied to a supporting material and the inert solvent is then removed.

3

The following examples serve to illustrate the invention without in any way limiting it.

*Example 1*

143 parts of tetrachlorophthalic acid anhydride, 98 parts of maleic acid anhydride, 73 parts of glycol and 170 parts of pentachlorophenyl monoglycerine ether are heated at 160° C. until the temperature at which the distillate passes over has dropped to 80° C. Nitrogen is passed over during the reaction and the mixture is stirred. After the temperature at which the distillate passes over has dropped to 80° C., the pressure is progressively reduced until a pressure of 20 mm. is reached. The temperature at which the distillate passes over should drop uniformly during this time. After 3 hours, altogether 27 parts of water have passed over. A polyester with a chlorine content of 35.4% is thus obtained. The temperature is then reduced to 150° C. and 0.15 part of hydroquinone is added. At 120° C. 195 parts of styrene are added. Copolymerization with 2% of cyclohexanol peroxide and 0.5% cobalt naphthenate at room temperature produces a plastic with the following mechanical properties:

| | |
|---|---|
| Impact strength _____kg./cm.² __ | 10 |
| Bending strength _____kg./cm.² __ | 1100 |
| Brinell hardness after 10″ _____kg.__ | 1420 |
| Brinell hardness after 60″ _____kg.__ | 1360 |
| Martens temperature _____° C__ | 80 |

The smouldering time of the plastic after removing the flame is 3 seconds.

*Example 2*

143 parts of tetrachlorophthalic acid anhydride, 49 parts of maleic acid anhydride, 40 parts of glycol and 170 parts of pentachlorophenyl monoglycerine ether are heated to 180° C. as described in Example 1 until the temperature at which the distillate passes over has dropped to 80° C. After vacuum esterification, which lasts about 3 hours, a total of 17 parts of water have passed over. The polyester thus obtained contains 42.2% of chlorine. For stabilizing purposes, 0.15 part of hydroquinone is added, and 165 parts of styrene are added for the copolymerization. The copolymerization is initiated by adding 1% benzoyl peroxide at 100° C. A crystal-clear plastic is obtained which has good mechanical properties and has a smouldering time of less than 2 seconds.

*Example 3*

2 parts of water and 3 parts of hexahydrodimethyl aniline are incorporated in 100 parts of a linear polyester with a chlorine content of 23.5% formed from 292 g. of adipic acid, 152 g. of tetrachlorophthalic acid, 170 g. of pentachlorophenyl monoglycerine ether and 160 g. of ethylene glycol by condensation at 190–220° and having the OH number 96 and the acid number 1, and 45–50 parts of toluylene diisocyanate are mixed therewith by stirring at room temperature. The foaming process commences after a few minutes, and, after removal from the mold, there is obtained a semi-elastic foam product showing an improvement as regards non-burning properties as compared with the normal polyesterisocyanate foam products. The smouldering time of the foam product after removing the flame is 3 seconds.

The flame-proofing effect can be still further considerably improved by adding 3–6 parts of antimony trioxide to the polyester.

*Example 4*

357 parts of hexachloro-endomethylene tetrahydrophthalic acid anhydride, 196 parts of maleic acid anhydride, 407 parts of 2,4,6-trichlorophenyl monoglycerine ether and 100 parts of glycol are heated to 180° C. as described in Example 1 until the temperature at which the distillate passes over has dropped to 80° C. The resulting polyester contains 37% of chlorine. For stabilizing purposes 0.425 part of hydroquinone is added and 430 parts of styrene are added for the copolymerization. The copolymerization is initiated by adding 2% of cumol peroxide at 100° C. A crystal-clear plastic is obtained which has a smouldering time of less than 4 seconds.

*Example 5*

A polyester with an OH number of 315, an acid number of 2 and a chlorine content of 24% is prepared from 365 parts of adipic acid, 152 parts of tetrachlorophthalic acid, 536 parts of trimethylol propane and 170 parts of pentachlorophenyl monoglycerine ether by thermal condensation at a temperature of 200–210° C.

17.3 parts of that polyester are mixed with 9.4 parts of butyl acetate, 9.4 parts of ethyl acetate, 9.4 parts of toluene and 9.5 parts of glycol-monomethyl ether acetate. To this solution 52 parts of a 75% solution of 1 mol of trimethylol propane and 3 mols of toluylene diisocyanate in ethyl acetate are added while stirring. After standing for some hours, a crystal-clear lacquer is obtained which has good mechanical properties and has a smouldering time of less than 2 seconds.

What is claimed is:

1. A resinous polyester containing about 20% to about 50% by weight of chemically combined chlorine comprising the thermal esterification product of a mixture of (1) a polycarboxylic acid containing only hydrogen, carbon and oxygen, (2) at least one chlorinated polycarboxylic acid selected from the group consisting of tetrachlorophthalic acid, hexachloroendomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether and trichlorophenyl monoglycerine ether, the molar ratio of chlorinated acid to chlorinated alcohol being within the range of about 1:4 to about 3:1.

2. A resinous polyester containing about 20% to about 50% by weight of chemically combined chlorine comprising the thermal esterification product of a mixture of tetracholorophthalic acid anhydride, maleic acid anhydride, ethylene glycol and pentachlorophenly monoglycerine ether, the molar ratio of tetrachlorophthalic acid anhydride to pentachlorophenyl monoglycerine ether being within the range of about 1:4 to about 3:1.

3. A resinous polyester containing about 20% to about 50% by weight of chemically combined chlorine comprising the thermal esterification product of a mixture of adipic acid, tetrachlorophthalic acid, pentachlorophenyl monoglycerine ether and ethylene glycol, the molar ratio of tetrachlorophthalic acid to pentachlorophenyl monoglycerine ether being within the range of about 1:4 to about 3:1.

4. A resinous polyester containing about 20% to about 50% by weight of chemically combined chlorine comprising the thermal esterification product of a mixture of hexachloro-endomethylene-tetrahydrophthalic acid anhydride, maleic acid anhydride, trichlorophenyl monoglycerine ether and ethylene glycol, the molar ratio of hexachloro-endomethylene-tetrahydrophthalic acid anhydride to trichlorophenyl monoglycerine ether being within the range of about 1:4 to about 3:1.

5. A resinous polyester containing about 20% to about 50% by weight of chemically combined chlorine comprising the thermal esterification product of a mixture of adipic acid, tetrachlorophthalic acid, pentachlorophenyl monoglycerine ether and trimethylol propane, the molar ratio of tetrachlorophthalic acid to pentachlorophenyl monoglycerine ether being within the range of about 1:4 to about 3:1.

6. A process for the preparation of a resinous polyester containing about 20% to about 50% by weight of chemically combined chlorine which comprises thermally esterifying a mixture of (1) a polycarboxylic acid containing only hydrogen, carbon and oxygen, (2) at least one chlorinated polycarboxylic acid selected from the group consisting of tetrachlorophthalic acid, hexachloro-endomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether, and trichlorophenyl monoglycerine ether, the molar ratio of chlorinated acid to chlorinated alcohol being within the range of about 1:4 to about 3:1.

7. A process for the preparation of a resinous polyester containing about 20% to about 50% by weight of chemically combined chlorine which comprises thermally esterifying a mixture of tetrachlorophthalic acid anhydride, maleic acid anhydride, ethylene glycol and pentachlorophenyl monoglycerine ether, the molar ratio of tetrachlorophthalic acid anhydride to pentachlorophenyl monoglycerine ether being within the range of about 1:4 to about 3:1.

8. A process for the preparation of a resinous polyester containing about 20% to about 50% by weight of chemically combined chlorine which comprises thermally esterifying a mixture of adipic acid, tetrachlorophthalic acid, pentachlorophenyl monoglycerine ether and ethylene glycol, the molar ratio of tetrachlorophthalic acid to pentachlorophenyl monoglycerine ether being within the range of about 1:4 to about 3:1.

9. A process for the preparation of a resinous polyester containing about 20% to about 50% by weight of chemically combined chlorine which comprises thermally esterifying a mixture of hexachloro-endomethylene-tetrahydrophthalic acid anhydride, maleic acid anhydride, trichlorophenyl monoglycerine ether and ethylene glycol, the molar ratio of hexachloro-endomethylene-tetrahydrophthalic acid anhydride to trichlorophenyl monoglycerine ether being within the range of about 1:4 to about 3:1.

10. A process for the preparation of a resinous polyester containing about 20% to about 50% by weight of chemically combined chlorine which comprises thermally esterifying a mixture of adipic acid, trichlorophthalic acid, pentachlorophenyl monoglycerine ether and trimethylol propane, the molar ratio of trichlorophthalic acid to pentachlorophenyl monoglycerine ether being within the range of about 1:4 to about 3:1.

11. A fireproof plastic obtained by reacting a polymerizable ethylenically unsaturated monomer with an ethylenically unsaturated resinous polyester containing about 20% to about 50% by weight of chemically combined chlorine, said polyester having been obtained by the thermal esterification of a mixture of (1) a polycarboxylic acid containing only hydrogen, carbon and oxygen, (2) at least one chlorinated polycarboxylic acid selected from the group consisting of tetrachlorophthalic acid, hexachloro-endomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether and trichlorophenyl monoglycerine ether, the molar ratio of chlorinated acid to chlorinated alcohol being within the range of about 1:4 to about 3:1, at least one member selected from the group consisting of said polycarboxylic acid containing only hydrogen, carbon and oxygen and said polyhydric alcohol containing only hydrogen, carbon and oxygen being ethylenically unsaturated.

12. A fireproof plastic obtained by reacting styrene with an unsaturated resinous polyester containing about 20% to about 50% by weight of chemically combined chlorine in the presence of an organic peroxide, said unsaturated resinous polyester having been obtained by the thermal esterification of a mixture of tetrachlorophthalic acid anhydride, maleic acid anhydride, ethylene glycol and pentachlorophenyl monoglycerine ether, the molar ratio of tetrachlorophthalic acid anhydride to pentachlorophenyl monoglycerine ether being within the range of about 1:4 to about 3:1.

13. A fireproof plastic obtained by reacting styrene with an unsaturated resinous polyester containing about 20% to about 50% by weight of chemically combined chlorine in the presence of an organic peroxide, said unsaturated resinous polyester having been obtained by the thermal esterification of a mixture of hexachloro-endomethylene-tetrahydrophthalic acid anhydride, maleic acid anhydride, trichlorophenyl monoglycerine ether and ethylene glycol, the molar ratio of hexachloro-endomethylene-tetrahydropthalic acid anhydride to trichlorophenyl monoglycerine ether being within the range of about 1:4 to about 3:1.

14. A fireproof plastic obtained by reacting an organic polyisocyanate with a resinous polyester containing about 20% to about 50% by weight of chemically combined chlorine and having terminal groups selected from the class consisting of hydroxyl and carboxyl groups, said resinous polyester having been obtained by the thermal esterification of a mixture of (1) a polycarboxylic acid containing only hydrogen, carbon and oxygen, (2) at least one chlorinated polycarboxylic acid selected from the group consisting of tetrachlorophthalic acid, hexachloro-endomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether and trichlorophenyl monoglycerine ether, the molar ratio of chlorinated acid to chlorinated alcohol being within the range of about 1:4 to about 3:1.

15. A fireproof plastic obtained by reacting toluylene diisocyanate with a resinous polyester containing about 20% to about 50% by weight of chemically combined chlorine and having terminal groups selected from the class consisting of hydroxyl and carboxyl groups, in the presence of water and a tertiary amine, said resinous polyester having been obtained by the thermal esterification of a mixture of adipic acid, tetrachlorophthalic acid, pentachlorophenyl monoglycerine ether and ethylene glycol, the molar ratio of tetrachlorophthalic acid to pentachlorophenyl monoglycerine ether being within the range of about 1:4 to about 3:1.

16. A fireproof plastic obtained by reacting an organic polyisocyanate with a resinous polyester containing about 20% to about 50% by weight of chemically combined chlorine and having terminal groups selected from the class consisting of hydroxyl and carboxyl groups, said resinous polyester having been obtained by the thermal esterification of a mixture of adipic acid, tetrachlorophthalic acid, pentachlorophenyl monoglycerine ether and trimethylol propane, the molar ratio of tetrachlorophthalic acid to pentachlorophenyl monoglycerine ether being within the range of about 1:4 to about 3:1.

17. A process for the preparation of a fireproof plastic which comprises reacting a polymerizable ethylenically unsaturated monomer with an unsaturated resinous polyester containing about 20% to about 50% by weight of chemically combined chlorine, said polyester having been obtained by the thermal esterification of a mixture of (1) a polycarboxylic acid containing only hydrogen, carbon and oxygen, (2) at least one chlorinated polycarboxylic acid selected from the group consisting of tetrachlorophthalic acid, hexachloro-endomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether and trichlorophenyl monoglycerine ether, the molar ratio of chlorinated acid to chlorinated alcohol being within the range of about 1:4 to about 3:1, at least one member selected from the group consisting of said polycarboxylic acid containing only hydrogen, carbon and oxygen and said polyhydric alcohol containing only hydrogen, carbon and oxygen being ethylenically unsaturated.

18. A process for the preparation of a fireproof plastic which comprises reacting an organic polyisocyanate with a resinous polyester containing about 20% to about 50% by weight of chemically combined chlorine and having terminal groups selected from the class consisting of hydroxyl and carboxyl groups, said resinous polyester having been obtained by the thermal esterification of a mixture of (1) a polycarboxylic acid containing only hydrogen, carbon and oxygen, (2) at least one chlorinated polycarboxylic acid selected from the group consisting of tetrachlorophthalic acid, hexachloro-endomethylene-tetrahydrophthalic acid and their anhydrides, (3) a polyhydric alcohol containing only hydrogen, carbon and oxygen and having no more than three hydroxyl groups and (4) at least one chlorinated polyhydric alcohol selected from the group consisting of pentachlorophenyl monoglycerine ether, tetrachlorophenyl monoglycerine ether and trichlorophenyl monoglycerine ether, the molar ratio of chlorinated acid to chlorinated alcohol being within the range of about 1:4 to about 3:1.

References Cited in the file of this patent

UNITED STATES PATENTS

| | | |
|---|---|---|
| 2,606,910 | Herzfeld et al. | Aug. 12, 1952 |
| 2,779,701 | Robitschek | Jan. 29, 1957 |

OTHER REFERENCES

Robitschek et al.: Ind. and Eng. Chem., volume 46, No. 8, August 1954, pages 1628–1632.